United States Patent
Okado

(10) Patent No.: US 8,988,593 B2
(45) Date of Patent: Mar. 24, 2015

(54) IMAGE SENSOR AND IMAGE CAPTURING APPARATUS WITH FOCUS DETECTION PIXELS

(75) Inventor: Teruyuki Okado, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/877,598

(22) PCT Filed: Sep. 29, 2011

(86) PCT No.: PCT/JP2011/073032
§ 371 (c)(1),
(2), (4) Date: Apr. 3, 2013

(87) PCT Pub. No.: WO2012/053363
PCT Pub. Date: Apr. 6, 2012

(65) Prior Publication Data
US 2013/0201383 A1    Aug. 8, 2013

(30) Foreign Application Priority Data

Oct. 20, 2010 (JP) ................................. 2010-235877

(51) Int. Cl.
| | | |
|---|---|---|
| *H04N 5/232* | (2006.01) | |
| *G03B 13/00* | (2006.01) | |
| *G02B 7/34* | (2006.01) | |
| *G03B 13/36* | (2006.01) | |
| *G03B 33/16* | (2006.01) | |
| *H04N 5/369* | (2011.01) | |
| *H04N 5/347* | (2011.01) | |
| *H04N 5/3745* | (2011.01) | |

(Continued)

(52) U.S. Cl.
CPC .............. *H04N 5/23212* (2013.01); *G02B 7/34* (2013.01); *G03B 13/36* (2013.01); *G03B 33/16* (2013.01); *H04N 5/3696* (2013.01); *H04N 5/347* (2013.01); *H04N 5/37457* (2013.01); *H04N 5/378* (2013.01); *H04N 9/045* (2013.01)
USPC ........................................................ 348/349

(58) Field of Classification Search
None
See application file for complete search history.

(56) References Cited

U.S. PATENT DOCUMENTS

| | | | |
|---|---|---|---|
| 8,164,679 B2 | 4/2012 | Kusaka | .......................... 348/345 |
| 2009/0096886 A1* | 4/2009 | Kusaka | ...................... 348/222.1 |
| 2009/0128678 A1* | 5/2009 | Kitami et al. | .................. 348/308 |

(Continued)

FOREIGN PATENT DOCUMENTS

| | | |
|---|---|---|
| JP | 2000-292686 A | 10/2000 |
| JP | 2003-189183 A | 7/2003 |

(Continued)

*Primary Examiner* — Albert Cutler
(74) *Attorney, Agent, or Firm* — Fitzpatrick, Cella, Harper & Scinto

(57) ABSTRACT

An image sensor comprises a plurality of pixels covered by color filters and arranged two-dimensionally in a first direction and a second direction perpendicular to the first direction; and a read out means capable of reading by switching between a first read out method for reading a signal from each of the plurality of pixels and a second read out method for reading by adding signals in the first direction within each pixel group including a predetermined number of pixels covered by a color filter of a same color. The plurality of pixels include a plurality of pixel groups of first focus detection pixels and a plurality of pixel groups of second focus detection pixels, arranged discretely, and the first and second focus detection pixels are partially shielded from light on different sides in the second direction so as to receive light transmitted through different exit pupil regions.

8 Claims, 15 Drawing Sheets

(51) Int. Cl.
*H04N 5/378* (2011.01)
*H04N 9/04* (2006.01)

(56) References Cited

U.S. PATENT DOCUMENTS

2010/0091161 A1    4/2010  Suzuki ........................ 348/302
2010/0110272 A1*   5/2010  Sugawara .................... 348/341

FOREIGN PATENT DOCUMENTS

| JP | 2008-312073 A | | 12/2008 |
| JP | 2009-86424 A | | 4/2009 |
| JP | 2009-177741 A | | 8/2009 |
| JP | 2009177741 | * | 8/2009 |
| WO | WO2010004728 | * | 1/2010 |

* cited by examiner

FIG. 1A

|    | 0 | 1 | 2 | 3 | 4 | 5 | 6 | 7 | 8 | 9 | 10 | 11 | 12 | 13 | 14 | 15 | 16 |
|----|---|---|---|---|---|---|---|---|---|---|----|----|----|----|----|----|----|
| 0  | R | G | R | G | R | G | R | G | R | G | R  | G  | R  | G  | R  | G  | G  |
| 1  | G | B | G | B | G | B | G | B | G | B | G  | B  | G  | B  | G  | B  | B  |
| 2  | R | G | R | G | R | G | R | G | R | G | R  | G  | R  | G  | R  | G  | G  |
| 3  | G | B | G | B | G | B | G | B | G | B | G  | B  | G  | B  | G  | B  | B  |
| 4  | R | G | R | G | R | G | R | G | R | G | R  | G  | R  | G  | R  | G  | G  |
| 5  | G | B | G | B | G | B | G | B | G | B | G  | B  | G  | B  | G  | B  | B  |
| 6  | R | G | R | G | R | G | R | G | R | G | R  | G  | R  | G  | R  | G  | G  |
| 7  | G | B | G | B | G | B | G | B | G | B | G  | B  | G  | B  | G  | B  | B  |
| 8  | R | G | R | G | R | G | R | G | R | G | R  | G  | R  | G  | R  | G  | G  |
| 9  | G | B | G | B | G | B | G | B | G | B | G  | B  | G  | B  | G  | B  | B  |
| 10 | R | G | R | G | R | G | R | G | R | G | R  | G  | R  | G  | R  | G  | G  |
| 11 | G | B | G | B | G | B | G | B | G | B | G  | B  | G  | B  | G  | B  | B  |
| 12 | R | G | R | G | R | G | R | G | R | G | R  | G  | R  | G  | R  | G  | G  |
| 13 | G | B | G | B | G | B | G | B | G | B | G  | B  | G  | B  | G  | B  | B  |

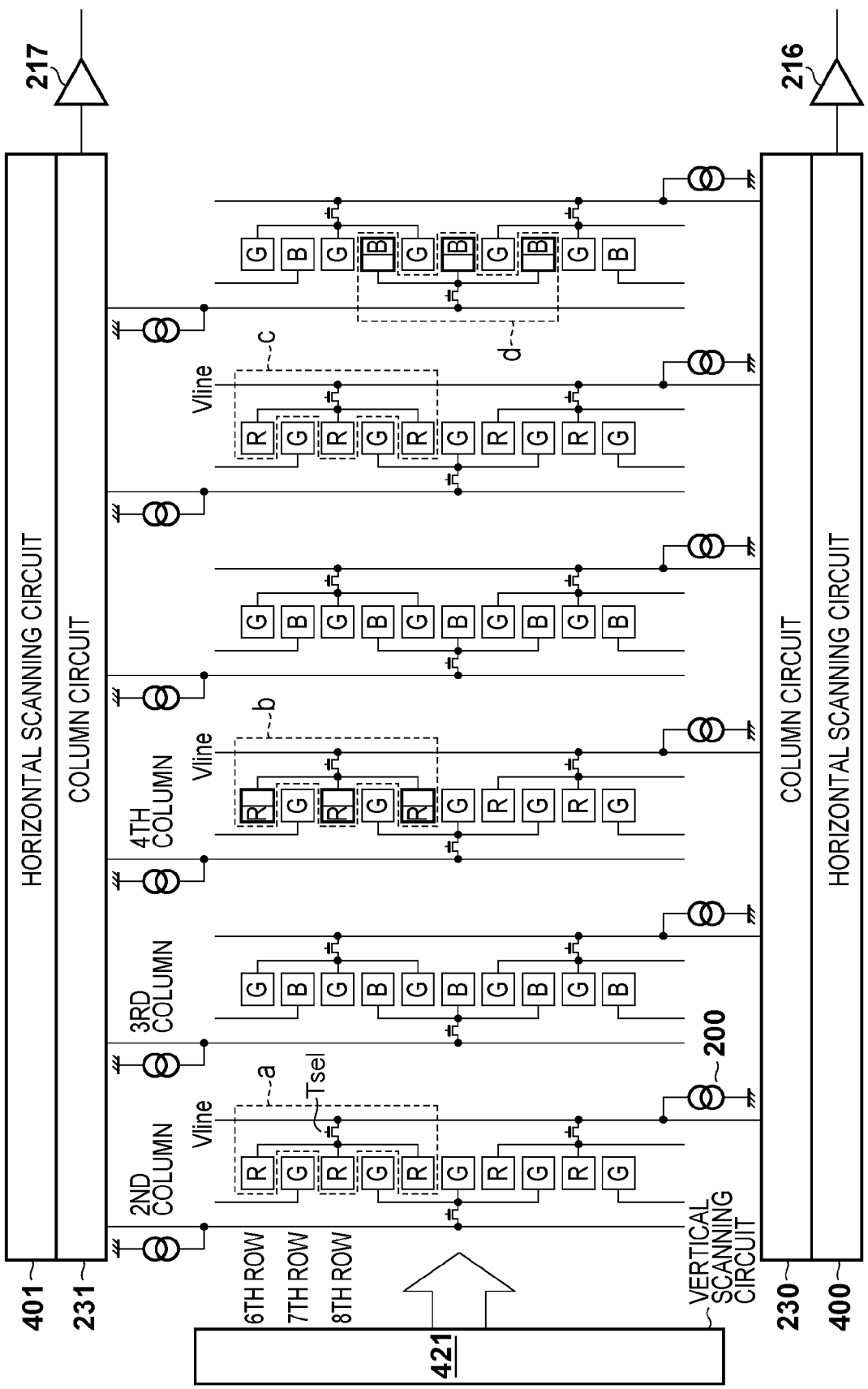

FIG. 7A

|    | 0 | 1 | 2 | 3 | 4 | 5 | 6 | 7 | 8 | 9 | 10 | 11 | 12 | 13 | 14 | 15 | 16 |
|----|---|---|---|---|---|---|---|---|---|---|----|----|----|----|----|----|----|
| 0  | R | G | R | G | R | G | R | G | R | G | R  | G  | R  | G  | R  | G  | R  |
| 1  | G | B | G | B | G | B | G | B | G | B | G  | B  | G  | B  | G  | B  | G  |
| 2  | R | G | R | G | R | G | R | G | R | G | R  | G  | R  | G  | R  | G  | R  |
| 3  | G | B | G | B | G | B | G | B | G | B | G  | B  | G  | B  | G  | B  | G  |
| 4  | R | G | R | G | R | G | R | G | R | G | R  | G  | R  | G  | R  | G  | R  |
| 5  | G | B | G | B | G | B | G | B | G | B | G  | B  | G  | B  | G  | B  | G  |
| 6  | R | G | R | G | R | G | R | G | R | G | R  | G  | R  | G  | R  | G  | R  |
| 7  | G | B | G | B | G | B | G | B | G | B | G  | B  | G  | B  | G  | B  | G  |
| 8  | R | G | R | G | R | G | R | G | R | G | R  | G  | R  | G  | R  | G  | R  |
| 9  | G | B | G | B | G | B | G | B | G | B | G  | B  | G  | B  | G  | B  | G  |
| 10 | R | G | R | G | R | G | R | G | R | G | R  | G  | R  | G  | R  | G  | R  |
| 11 | G | B | G | B | G | B | G | B | G | B | G  | B  | G  | B  | G  | B  | G  |
| 12 | R | G | R | G | R | G | R | G | R | G | R  | G  | R  | G  | R  | G  | R  |
| 13 | G | B | G | B | G | B | G | B | G | B | G  | B  | G  | B  | G  | B  | G  |

FIG. 9A

|    | 0 | 1 | 2 | 3 | 4 | 5 | 6 | 7 | 8 | 9 | 10 | 11 | 12 | 13 | 14 | 15 | 16 |
|----|---|---|---|---|---|---|---|---|---|---|----|----|----|----|----|----|----|
| 0  | R | G | R | G | R | G | R | G | R | G | R  | G  | R  | G  | R  | G  | R  |
| 1  | G | B | G | B | G | B | G | B | G | B | G  | B  | G  | B  | G  | B  | G  |
| 2  | R | G | R | G | R | G | R | G | R | G | R  | G  | R  | G  | R  | G  | R  |
| 3  | G | B | G | B | G | B | G | B | G | B | G  | B  | G  | B  | G  | B  | G  |
| 4  | R | G | R | G | R | G | R | G | R | G | R  | G  | R  | G  | R  | G  | R  |
| 5  | G | B | G | B | G | B | G | B | G | B | G  | B  | G  | B  | G  | B  | G  |
| 6  | R | G | R | G | R | G | R | G | R | G | R  | G  | R  | G  | R  | G  | R  |
| 7  | G | B | G | B | G | B | G | B | G | B | G  | B  | G  | B  | G  | B  | G  |
| 8  | R | G | R | G | R | G | R | G | R | G | R  | G  | R  | G  | R  | G  | R  |
| 9  | G | B | G | B | G | B | G | B | G | B | G  | B  | G  | B  | G  | B  | G  |
| 10 | R | G | R | G | R | G | R | G | R | G | R  | G  | R  | G  | R  | G  | R  |
| 11 | G | B | G | B | G | B | G | B | G | B | G  | B  | G  | B  | G  | B  | G  |
| 12 | R | G | R | G | R | G | R | G | R | G | R  | G  | R  | G  | R  | G  | R  |
| 13 | G | B | G | B | G | B | G | B | G | B | G  | B  | G  | B  | G  | B  | G  |

IMAGE SENSOR AND IMAGE CAPTURING APPARATUS WITH FOCUS DETECTION PIXELS

TECHNICAL FIELD

The present invention relates to an image sensor and image capturing apparatus that is capable of performing focus detection by a phase difference detection method based on signals obtained from the image sensor capable of shooting still images and moving images.

BACKGROUND ART

Among automatic focus detection/adjustment methods for image capturing apparatuses, common methods that use a luminous flux passing through a taking lens include a contrast detection method (also called a blur-based method) and phase difference detection method (also called a shift detection method).

The contrast detection method is often used in video movie cameras for movie shooting and electronic still cameras and uses an image sensor as a focus detection sensor. The method pays attention to an output signal of the image sensor, especially to information (contrast information) contained in a high-frequency component and regards the position of the taking lens which maximizes an evaluation value of the output signal as an in-focus point. However, the method is considered to be unsuitable for high-speed focus adjusting operation because the method, which is also known as a hill-climbing method, is required to find an evaluation value by finely moving the taking lens and continue moving the taking lens until the evaluation value turns out to be a maximum value.

The other method, that is, the phase difference detection method, is frequently used for single-lens reflex cameras which utilize silver-halide film and is a technique which has made the greatest contribution to the commercialization of Auto Focus (AF) single-lens reflex cameras. With the phase difference detection method, first a luminous flux passing through an exit pupil of the taking lens is split into two streams, which are then received by a pair of focus detection sensors. Then, by detecting amounts of deviation between signals outputted according to amounts of light received by the focus detection sensors, that is, amounts of relative displacement in a splitting direction of the luminous flux, the phase difference detection method directly determines an amount of deviation of the taking lens in a focusing direction. Thus, once the focus detection sensors accumulate data, an amount and direction of defocus are obtained, enabling high-speed focus adjusting operation. However, in order to split the luminous flux passing through the exit pupil of the taking lens into two streams and obtain signals corresponding to the resulting two luminous fluxes, it is common practice to install light splitting unit such as a quick return mirror or half mirror on an image sensing optical path and install focus detection optics and an AF sensor behind the light splitting means. This has the disadvantage of increasing the size and cost of the apparatus.

To overcome the above disadvantage, a technique has been disclosed which gives a phase difference detection function to an image sensor, eliminating the need for a dedicated AF sensor, and implements a high-speed phase difference AF.

For example, Japanese Patent Laid-Open No. 2000-292686 discloses a technique for giving a pupil division function to an image sensor by splitting light-receiving units of some pixels of the image sensor into two parts. The technique carries out phase difference focus detection by arranging these pixels as focus detection pixels at predetermined intervals in image sensing pixels. Since image sensing pixels are missing in locations where the focus detection pixels are arranged, the technique creates image information by interpolation using information obtained from surrounding image sensing pixels.

On the other hand, even with single-lens reflex cameras, it has become common practice to use solid-state image sensors such as CCD and CMOS sensors as image sensing media instead of silver-halide film. Consequently, products provided with an electronic viewfinder mode and/or movie recording mode as well as an optical finder have appeared on the market. The electronic viewfinder mode captures moving images by retracting quick return mirror from the image sensing optical path, displays the captured moving images on a display device (currently, a liquid crystal display device is used generally) installed in the body, and thereby allows the user to view a subject. Also, such a camera can record not only still images, but also moving images on a recording medium in movie recording mode. During movie capture, which attaches importance to frame rate to enable a smooth screen display, part of pixels used for still images are not read out to improve the frame rate.

On the other hand, to improve image quality during movie display and improve sensitivity at low luminance, Japanese Patent Laid-Open No. 2003-189183 proposes an image sensor capable of producing output by switching between pixel skipping mode and pixel binning mode. That is, in order to improve the image quality of moving images, it is proposed to read in the pixel binning mode for moire reduction when moire is likely to occur because of a high spatial frequency of the subject while using the pixel skipping mode when smear is likely to occur because of high luminance of the subject.

However, the known techniques described above have the following disadvantages.

Normally, a resolution higher than that of still images is not required of the electronic viewfinder and movie modes, for which a smooth screen display is important. Therefore, in the electronic viewfinder and movie modes, it is common practice to improve frame rate by generating images by reading the solid-state image sensor by pixel skipping or pixel binning. In this case, with an arrangement of focus detection pixels described in Japanese Patent Laid-Open No. 2000-292686, there may be cases in which focus detection pixels are not read when the solid-state image sensor is read by pixel skipping, resulting in inability to detect focus using the phase difference method.

It is conceivable to arrange the focus detection pixels in rows (or columns) which are not skipped and thereby ensure that the focus detection pixels will be read even with pixel skipping. However, a technique which switches between the pixel skipping mode and pixel binning mode according to a scene during reading of moving images, such as the technique proposed in Japanese Patent Laid-Open No. 2003-189183, presents the following problem. That is, the focus detection pixels, which can be read properly by pixel skipping, cannot be read properly by pixel binning, in which normal pixels are added to the focus detection pixels.

Furthermore, even in the pixel binning mode, it is conceivable to read only focus detection pixels in the case of pixel groups which contain a combination of normal pixels and focus detection pixels. However, this has a problem in that a wiring layout of control wires will become complicated.

SUMMARY OF INVENTION

The present invention has been made in consideration of the above situation, and enables reading signals from focus detection pixels separately from signals from normal pixels during pixel binning without complicating a wiring layout.

According to one aspect of the present invention, there is provided an image sensor comprising: a plurality of pixels covered by color filters and arranged two-dimensionally in a first direction and a second direction perpendicular to the first direction; and read out means capable of reading by switching between a first read out method for reading a signal from each of the plurality of pixels and a second read out method for reading by adding signals in the first direction within each pixel group made up of a predetermined number of pixels covered by a color filter of a same color, wherein the plurality of pixels include a plurality of pixel groups of first focus detection pixels and a plurality of pixel groups of second focus detection pixels, arranged discretely, and the first focus detection pixels and the second focus detection pixels are partially shielded from light on different sides in the second direction so as to receive light transmitted through different exit pupil regions.

According to another aspect of the present invention, there is provided an image capturing apparatus comprising: the image sensor as described above; detection means adapted to detect a focus state based on a phase difference between two images obtained from signals read out of the first focus detection pixels and the second focus detection pixels, respectively; and focus adjusting means adapted to adjust focus based on the detected focus state.

Further features of the present invention will become apparent from the following description of exemplary embodiments (with reference to the attached drawings).

BRIEF DESCRIPTION OF DRAWINGS

The accompanying drawings, which are incorporated in and constitute a part of the specification, illustrate embodiments of the invention, and together with the description, serve to explain the principles of the invention.

FIGS. 1A to 1C are diagrams showing an exemplary pixel arrangement of part of pixels in an image sensor according to a first embodiment;

FIG. 2 is a diagram showing wiring of part of pixels in the image sensor according to the first embodiment;

FIGS. 7A to 7C are diagrams showing an exemplary pixel arrangement of part of pixels in an image sensor according to a second embodiment;

FIGS. 9A to 9C are diagrams showing an exemplary pixel arrangement of part of pixels in an image sensor according to a third embodiment;

DESCRIPTION OF EMBODIMENTS

Exemplary embodiments of the present invention will be described in detail in accordance with the accompanying drawings. The dimensions, shapes and relative positions of the constituent parts shown in the embodiments should be changed as convenient depending on various conditions and on the structure of the apparatus adapted to the invention, and the invention is not limited to the embodiments described herein.

First Embodiment

Figure 1B:
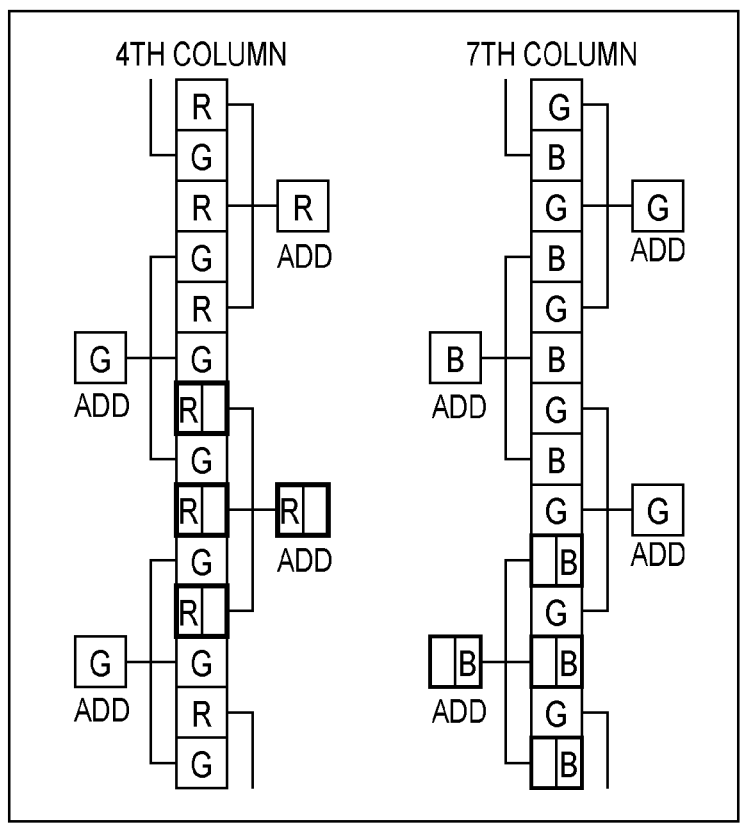
Figure 1C:
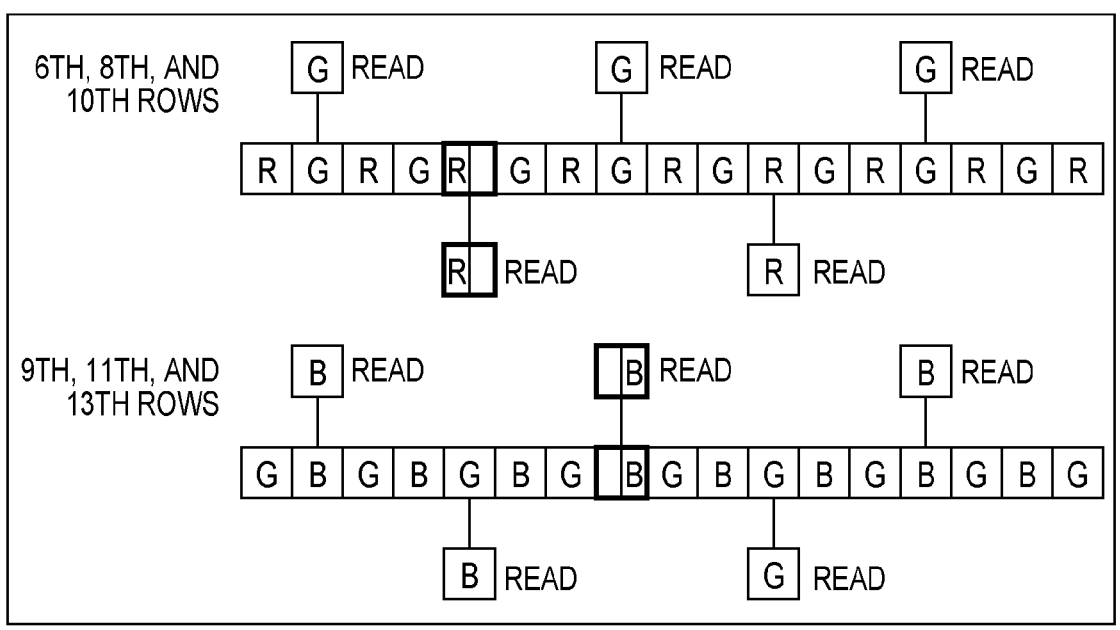

FIGS. 1A to 1C are diagrams showing an exemplary pixel array of part of pixels in an image sensor according to a first embodiment of the present invention, more specifically, an exemplary pixel arrangement in a CMOS solid-state image sensor.

As shown in FIG. 1A, it is assumed here that 17 pixels 0 to 16 and 14 pixels 0 to 13 are arranged two-dimensionally in an x direction (horizontal direction) and y direction (vertical direction), respectively, with R (red), G (green), and B (blue) color filters being arranged in a Bayer pattern on each pixel. A larger number of pixels than shown in FIGS. 1A to 1C are arranged in an actual image sensor, which includes optical black (OB) pixels and the like, but it is assumed here for the simplicity of explanation that 17×14 pixels are arranged as described above.

In the exemplary pixel arrangement in FIG. 1A, the pixels having x, y coordinates of (4, 6), (4, 8), and (4, 10) are originally R pixels while the pixels having x, y coordinates of (7, 9), (7, 11), and (7, 13) are originally B pixels. According to the first embodiment, these pixels are used as focus detection pixels and preferably either a G color filter is provided or no color filter is provided. However, symbols (R and B) which essentially represent colors in a Bayer array are presented in the diagrams referred to in the present embodiment. These pixels are provided with a horizontal pupil division function by partially shielding light-receiving portions of these pixels in a horizontal direction. Then, when arranged at predetermined intervals among image sensing pixels, the focus detection pixels can provide signals needed for phase difference focus detection. In the examples of FIGS. 1A to 1C, to detect the phase difference in the horizontal direction, multiple pairs of focus detection pixels adapted to receive light transmitted through different exit pupil regions are arranged at predetermined intervals in the horizontal direction. To receive the light transmitted through different exit pupil regions, the pixels having x, y coordinates of (4, 6), (4, 8), and (4, 10) are opposite to the pixels having x, y coordinates of (7, 9), (7, 11), and (7, 13) in terms of a region shielded from light. Such pairs of focus detection pixel groups are discretely arranged in the image sensor.

FIG. 1B is a diagram that shows how charges of three pixels of the same color in the 4th and 7th columns in the 17×14 pixel arrangement diagram in FIG. 1A are added together in the vertical direction (hereinafter referred to as vertical three same-color pixel addition) by taking into consideration a color barycenter in the Bayer arrangement. Also, FIG. 1C is a diagram showing how charges of ⅓ of pixels in the horizontal direction are read (hereinafter referred to as horizontal ⅓ reading) in the 6th, 8th, and 10th pixel rows and the 9th, 11th, and 13th pixel rows after the vertical three same-color pixel addition, by taking into consideration the color barycenter in the Bayer arrangement. In this example, signals are read out of the image sensor after the vertical pixel addition and horizontal pixel skipping (both horizontal and vertical pixel counts have been reduced to ⅓).

Worthy of note here is that all three of the pixels subjected to the vertical same-color pixel addition are focus detection pixels (which have the light-shielding portion on the same side for phase difference detection). This configuration makes it possible to prevent signals of normal pixels and signals of focus detection pixels from being mixed during vertical three same-color pixel addition.

On the other hand, assume that horizontal same-color pixel addition is applied to the R pixels in the 6th, 8th, and 10th rows, the pixels in the 2nd, 4th, and 6th columns will be added together by taking into consideration the color barycenter in the Bayer arrangement. Although it is conceivable to add pixels in the 2nd, 4th, and 6th columns with the pixels in the 2nd and 6th columns being replaced by focus detection pixels as in the case of the vertical pixel addition described above, such horizontal pixel addition is not desirable from the viewpoint of detecting horizontal phase differences. Therefore, according to the present embodiment a pixel skipping operation is performed in the horizontal direction. That is, to detect horizontal phase differences, focus detection pixels are arranged and added together in the vertical direction.

Out of the pixel outputs produced as a result of the vertical pixel addition and horizontal pixel skipping, those from the focus detection pixels are extracted and used for focus detection of the taking lens and an image of the subject is generated using the pixel outputs from the pixels other than the focus detection pixels. At this time, image signals from the locations of the focus detection pixels are interpolated from the signals of the surrounding image sensing pixels.

The term "addition" used in the above description includes an "arithmetic average," "weighted average," and the like, but techniques for generating a unit pixel signal by factoring in multiple pixel signals are not limited to these methods.

FIG. 2 is a diagram showing wiring of an image sensor including some of the pixels arranged as shown FIGS. 1A to 1C and a readout circuit of the pixels. The pixels having x, y coordinates of (2, 6) to (7, 15) are shown here. As in the case of FIGS. 1A to 1C, the pixels having x, y coordinates of (4, 6), (4, 8), and (4, 10) as well as the pixels having x, y coordinates of (7, 9), (7, 11), and (7, 13) are focus detection pixels. To perform vertical three-pixel addition, pixels are added together by each of pixel groups a, b, c, and d indicated by broken lines. Among these pixel groups, addition of pixel signals from each of the pixel groups a, b, and c will be described in detail with reference to FIG. 3.

Pixel signals from each pixel group subjected to vertical three-pixel addition are outputted individually or as an added signal to a vertical output line Vline via select transistors Tsel. With the wiring shown in FIG. 2, pixels of different colors in the same column are connected to different vertical output lines, current sources 200 as a vertical output line load, and column circuits 230 and 231 and are controlled by a vertical scanning circuit 421. Consequently, signals from two rows are read simultaneously to different vertical output lines Vline. Pixel signals read by the column circuits 230 and 231 are transferred in sequence to read amplifiers 216 and 217 by horizontal scanning circuits 400 and 401 and output externally.

Figure 3:
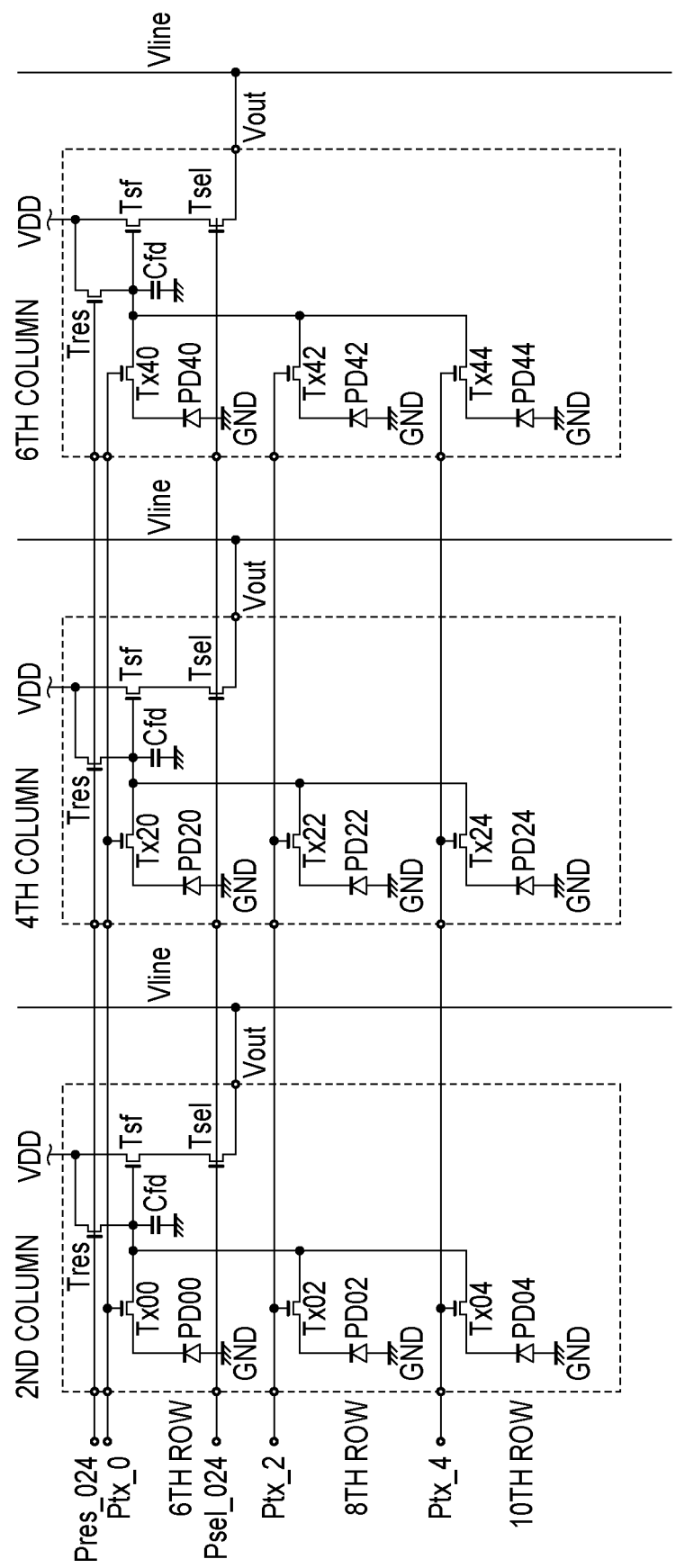
FIG. 3 is a detailed diagram of some pixel cells in the image sensor according to the first embodiment.

FIG. 3 illustrates details of the pixel groups a, b, and c shown in FIG. 2, that is, details of the pixels having x, y coordinates of (2, 6), (2, 8), and (2, 10); (4, 6), (4, 8), and (4, 10); and (6, 6), (6, 8), and (6, 10) in FIGS. 1A to 1C. Signals from photodiodes PD00 to PD44 of the respective pixels can be transferred to floating diffusion portions Cfd via respective transfer transistors Tx00 to Tx44, where each floating diffusion portion Cfd is shared by a group of three pixels in the vertical direction. The signals transferred to the floating diffusion portions Cfd are read to the vertical output lines Vline via source follower amplifiers Tsf whose drains are connected to a power supply VDD and via the select transistors Tsel. The floating diffusion portions Cfd are reset by being connected to the power supply VDD via reset transistors Tres while the pixels PD00 to PD44 are reset by being connected to the power supply VDD via the respective transfer transistors Tx00 to Tx44 and reset transistors Tres.

The reset transistors Tres, select transistors Tsel, and transfer transistors Tx00 to Tx44 are controlled on a row by row basis by Pres024, Psel024, Ptx_0, Ptx_2, and Ptx_4 outputted from the vertical scanning circuit 421 shown in FIG. 2.

With the configuration in FIG. 3, for example, if only Tx02, Tx22, and Tx42 are turned on by Ptx_2, signals from the pixels PD02, PD22, and PD42 in the 8th row are transferred independently to the respective floating diffusion portions Cfd. Also, for example, if all Tx00 to Tx44 are turned on by Ptx_0, Ptx_2, and Ptx_4, signals from the three pixels in the vertical direction are transferred to the respective floating diffusion portions Cfd, allowing vertical three-pixel addition to be realized.

Figure 4:
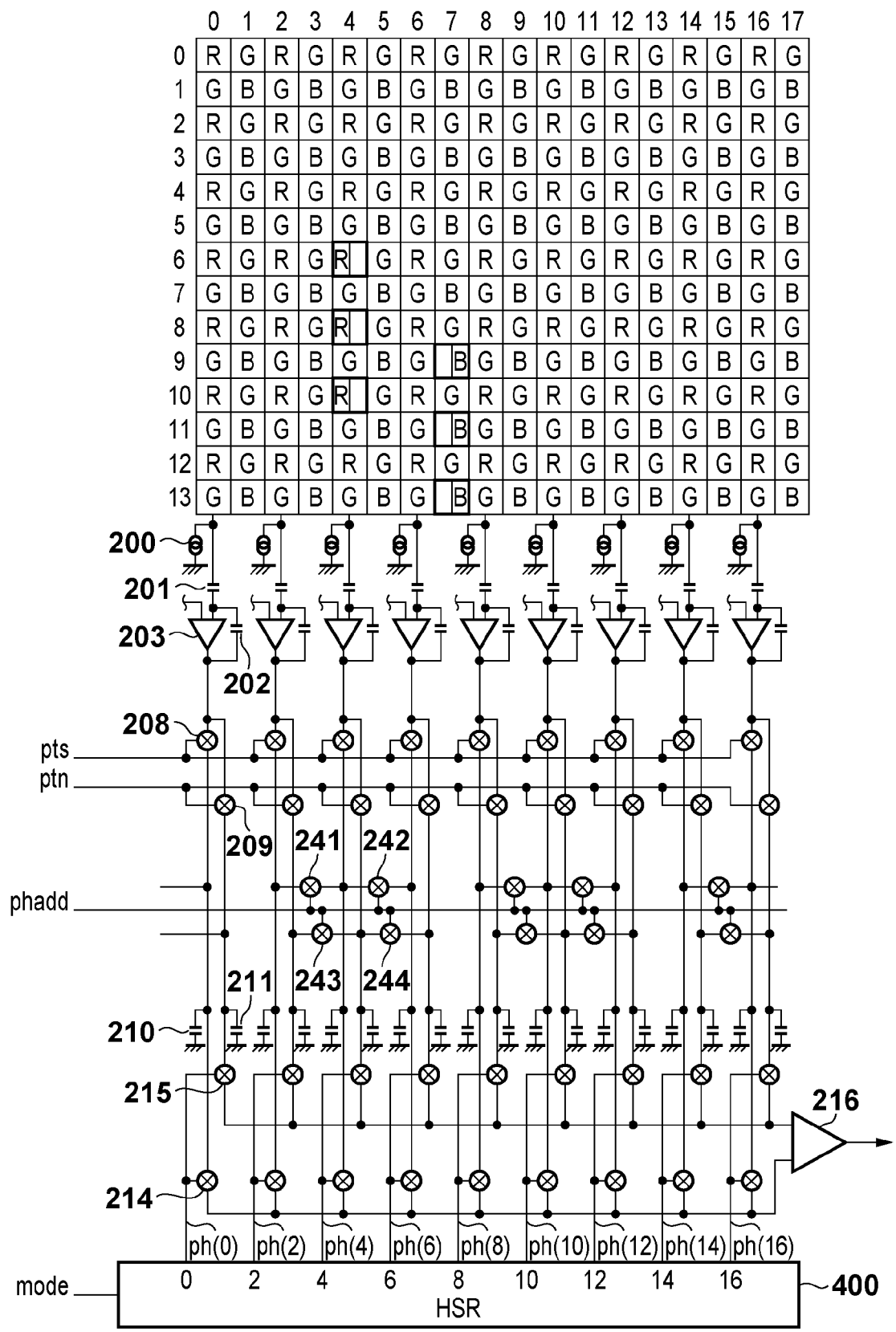
FIG. 4 is a diagram showing a detailed configuration of a column circuit according to the first embodiment.

FIG. 4 is a diagram illustrating in detail the column circuit 230 shown in FIG. 2. The column circuit 231 has a configuration similar to that of the column circuit 230. For purposes of explanation, FIG. 4 shows only the column circuit 230 which reads the signals from the R pixels including the pixel groups a, b, and c out of the pixels arranged in the Bayer array in FIG. 2.

Outputs from the pixels are inputted in capacitors 201 in the column circuit 230 via the vertical output lines connected with current source loads 200. Reference numeral 203 denotes operation amplifiers which make up inverting amplifiers in conjunction with respective feedback capacitors 202 and capacitors 201. The capacitors 201 and 202 as well as holding capacitors 210 and 211 in a subsequent stage are reset when the feedback capacitors 202 are short-circuited at both ends by an analog switch (not shown) controlled by a pc0r signal (not shown). Outputs from the operation amplifiers 203 are held in the respective holding capacitors 210 and 211 via analog switches 208 and 209 driven by pts and ptn pulses. It is assumed that signals produced just after the floating diffusion portions Cfd are reset are held in the holding capacitors 211 while signals produced just after signals from the pixels are transferred to the floating diffusion portions Cfd are held in the holding capacitors 210.

When pixel signals of one row is held in holding capacitors 210 and 211 on a column by column basis, ph(n) pulses are driven in sequence by the horizontal scanning circuit 400, causing analog switches 214 and 215 to open and close. Consequently, the pixel signals are inputted in a differential read amplifier 216 in a subsequent stage and outputted externally.

Analog switches 241 to 244 are used to interconnect holding capacitors for the pixels of the same color in adjacent columns and are driven by a phadd pulse. If the analog switches 241 to 244 are turned on once and then turned off, potentials held in the holding capacitors 210 and 211 are updated with average potentials of the adjacent columns.

The horizontal scanning circuit 400 is designed to be able to read only signals of predetermined columns out of the read amplifier 216 by skipping the ph(n) signals if it is found, by checking a mode signal, that column pixel skipping will be carried out.

It is set in advance to change the reading operation as follows: for example, if the mode signal indicates progressive scanning, the horizontal scanning circuit 400 outputs signals to the 0th, 2nd, 4th, 6th, 8th, . . . columns in sequence, and if the mode signal indicates pixel skipping or pixel addition, the horizontal scanning circuit 400 outputs signals to the 4th, 10th, 16th, . . . columns.

Signals of different colors are read from separate readout circuits using the above configuration and driving, but rearranged by a processing circuit in a subsequent stage (not shown) into the same pixel order as in the image sensor.

Figure 5:
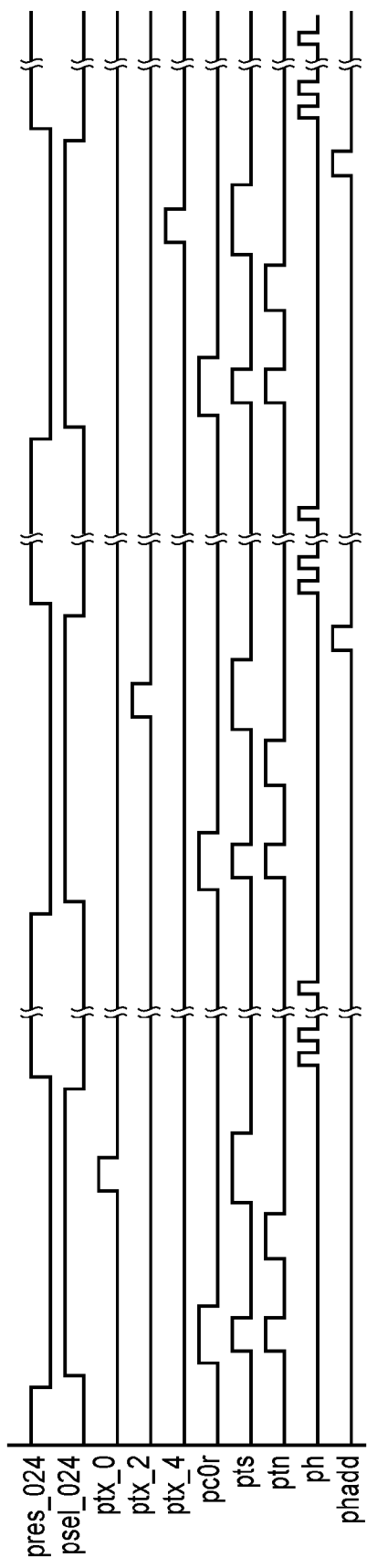
FIG. 5 is a drive timing chart of the image sensor according to the first embodiment.

FIG. 5 is a drive timing chart for driving the image sensor shown in FIGS. 2 to 4, showing a timing for scanning all the pixels without using pixel addition and pixel skipping. However, for the simplicity of explanation, only timings for scanning operations of the pixel groups a, b, and c in FIG. 2 are shown by omitting timings to reset all the pixels and start accumulating signals from all the pixels. Incidentally, it is assumed in FIG. 5 that relevant transistors and switches are turned on when signals are in Hi state, and turned off when signals are in Low state.

First, when Pres_024 changes from Hi to Low, turning off the reset transistors, the floating diffusion portions Cfd of the rows containing the pixel groups a, b, and c are disconnected from the power supply VDD and thereby released from reset. Subsequently, Psel_024 changes from Low to Hi, causing source follower outputs of the rows containing the pixel groups a, b, and c to be connected to the respective vertical output lines. Then, the pc0r signal goes Hi, turning on a switch adapted to short-circuit a column circuit feedback capacitor (not shown) at both ends. At the same time, the pts and ptn signals are set to Hi, turning on the analog switches 208 and 209 and thereby resetting the holding capacitors 210 and 211, feedback capacitors 202, and capacitors 201. Then, the pts and ptn signals are set to Low and the pc0r signal is set to Low, thereby releasing the capacitors from reset.

Subsequently, the ptn signal is changed from Low to Hi, then to Low to hold outputs from the floating diffusion portions Cfd of the rows containing the pixel groups a, b, and c in the holding capacitors 211. Furthermore, the pts signal is set to Hi to hold pixel signals in the holding capacitors 210, and the ptx_0 signal is changed from Low to Hi, then to Low to transfer the pixel signals in the 6th row to the floating diffusion portions Cfd. Subsequently, the pts signal is set to Hi to hold the pixel signals from the 6th row in the holding capacitors 210. Then, Psel_024 is set to Low and Pres_024 is set to Hi to reset the floating diffusion portions Cfd of the rows containing the pixel groups a, b, and c again. Then, the ph(n) signals are outputted in sequence by the horizontal scanning circuit 400 and signals from all the pixels in the 6th row are red in sequence to the read amplifier 216. At this time, the phadd signal remains Low, and thus the output signals are not averaged. The above are signal transfer and horizontal scanning in the 6th row.

Subsequently, by repeating the above operations, such as changing Pres_024 from Hi to Low and changing Psel_024 from Low to Hi, the pts signal is set to Hi at the moment when pixel signals are held in the holding capacitors 210. Furthermore, by changing the ptx_2 signal from Low to Hi, then to Low, the pixel signals in the 8th row can be transferred to the floating diffusion portions Cfd and held in the holding capacitors 210. Similarly, by changing the ptx_4 signal from Low to Hi, then to Low in a next iteration, the pixel signals in the 10th row can be read out.

Although only even-numbered rows have been described so far, regarding odd-numbered rows, signals can be read out of the column circuit 231 using similar control as described with reference to FIG. 2.

This ends the description of scanning of the rows containing the pixel groups a, b, and c, and signals can be read out of all the rows by scanning subsequent pixels in the similar manner.

Figure 6:
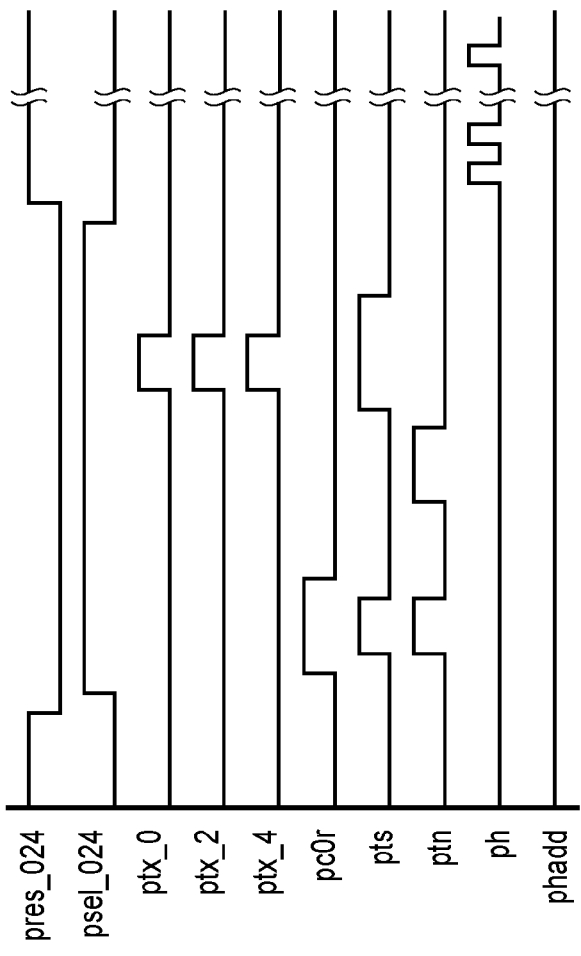
FIG. 6 is another drive timing chart of the image sensor according to the first embodiment.

FIG. 6 is a drive timing chart for realizing vertical three-pixel addition and horizontal ⅓ reading on the image sensor shown in FIGS. 2 to 4.

With the drive timing shown in FIG. 5, it is necessary to drive Ptx_0, Ptx_2, and Ptx_4 separately in order to scan all the pixels independently, that is, to read three rows of pixel signals from pixel groups independently. On the other hand, with the drive timing shown in FIG. 6, Ptx_0, Ptx_2, and Ptx_4 are driven simultaneously, thereby transferring signals of three pixels in the vertical direction to a single floating diffusion portion and thereby realizing vertical three-pixel addition. This eliminates the need to transfer signals on a row by row basis and thereby reduces the actual number of scanned lines, resulting in a reduced scanning time. Also, the horizontal scanning circuit 400 outputs only the ph(n) signals to the 4th, 10th, 16th, . . . rows and thereby performs a scan by reducing the number of pixels in the horizontal direction as well. The rest of the operation is the same as the drive timing shown in FIG. 5.

It is also possible to realize vertical ⅓ reading and horizontal ⅓ reading by driving only Ptx_2 using the same timing as when driving Ptx_0, Ptx_2, and Ptx_4 simultaneously.

As described with reference to FIGS. 1A to 6, in the present embodiment, all three of the pixels (pixel group) subjected to vertical same-color pixel addition are set to be focus detection pixels (which have the light-shielding portion on the same side for phase difference detection). This configuration makes it possible to prevent signals of normal pixels and signals of focus detection pixels from being mixed during vertical three same-color pixel addition without complicating wiring and realize progressive scanning.

Second Embodiment

Figure 7B:
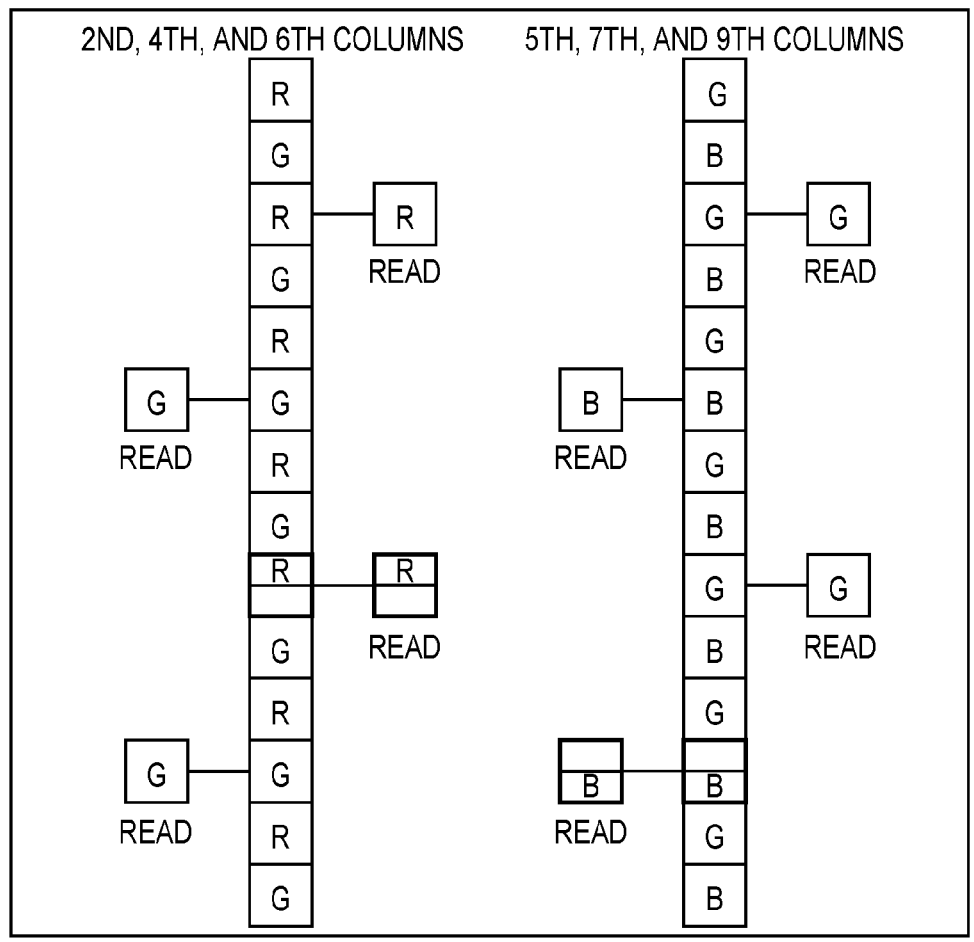
Figure 7C:
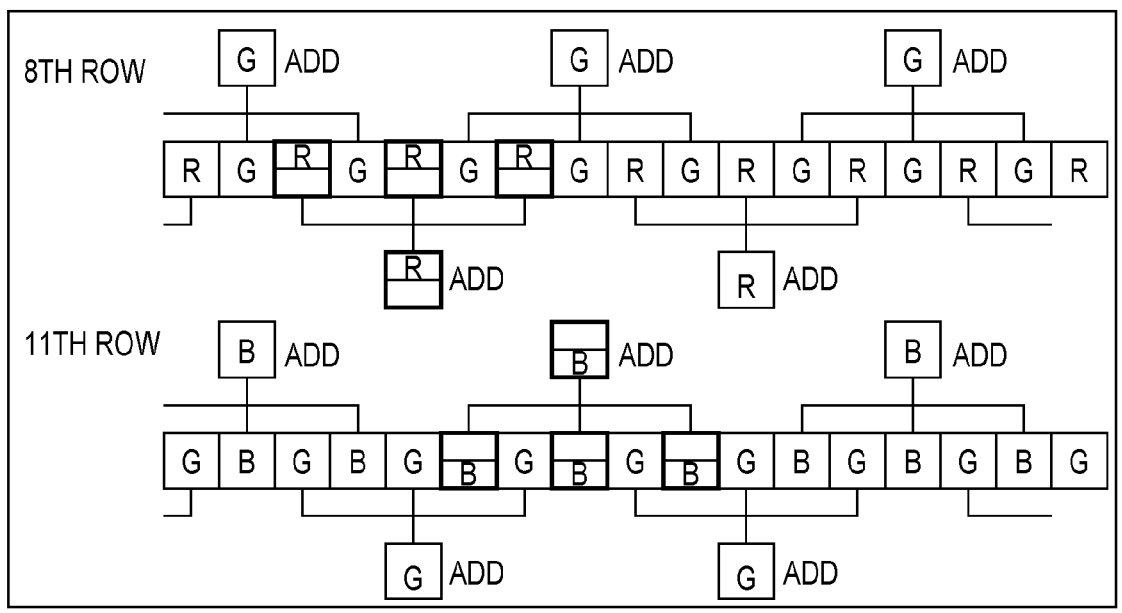

FIGS. 7A to 7C are diagrams showing an exemplary pixel array of part of pixels in an image sensor according to a second embodiment of the present invention, more specifically, an exemplary pixel arrangement in a CMOS solid-state image sensor also in the present embodiment.

In FIG. 7A, as in the case of FIG. 1A, it is assumed that 17 pixels 0 to 16 and 14 pixels 0 to 13 are arranged two-dimensionally in the x direction (horizontal direction) and y direction (vertical direction), respectively, with R (red), G (green), and B (blue) color filters being arranged in a Bayer pattern on each pixel. A larger number of pixels than shown in FIGS. 7A to 7C are arranged in an actual image sensor, which includes optical black (OB) pixels and the like, but it is assumed here for the simplicity of explanation that 17×14 pixels are arranged as described above.

In the exemplary pixel arrangement in FIG. 7A, the pixels having x, y coordinates of (2, 8), (4, 8), and (6, 8) are originally R pixels while the pixels having x, y coordinates of (5, 11), (7, 11), and (9, 11) are originally B pixels. According to the second embodiment, these pixels are used as focus detection pixels and preferably either a G color filter is provided or no color filter is provided. However, symbols (R and B) which essentially represent colors in a Bayer array are presented in the diagrams referred to in the present embodiment. These pixels are provided with a horizontal pupil division function by partially shielding light-receiving portions of these pixels in the vertical direction. Then, when arranged at predetermined intervals among image sensing pixels, the focus detection pixels can provide signals needed for phase difference focus detection. In the example of FIGS. 7A to 7C, to detect the phase difference in the vertical direction, multiple pairs of focus detection pixels adapted to receive light transmitted through different exit pupil regions are arranged at predetermined intervals in the vertical direction. To receive the light transmitted through different exit pupil regions, the pixels having x, y coordinates of (2, 8), (4, 8), and (6, 8) are opposite to the pixels having x, y coordinates of (5, 11), (7, 11), and (9, 11) in terms of a region shielded from light. Such pairs of focus detection pixel groups are discretely arranged in the image sensor.

FIG. 7B is a diagram that shows how vertical ⅓ pixel skipping is performed in the 2nd, 4th, and 6th columns and 5th, 7th, and 9th columns in the 17×14 pixel arrangement diagram in FIG. 7A by taking into consideration a color barycenter in the Bayer arrangement. FIG. 7C is a diagram showing how charges of three pixels of the same color in the 8th and 11th rows are added in the horizontal direction, by taking into consideration a color barycenter in the Bayer arrangement. In this example, signals are read out of the image sensor after the vertical pixel skipping and horizontal pixel addition (both horizontal and vertical pixel counts have been reduced to ⅓).

Worthy of note here is that all three of the pixels subjected to the horizontal same-color pixel addition are focus detection pixels (which have the light-shielding portion on the same side for phase difference detection). This configuration makes it possible to prevent signals of normal pixels and signals of focus detection pixels from being mixed during horizontal three same-color pixel addition.

On the other hand, assume that vertical same-color pixel addition is applied to the R pixels in the 2nd, 4th, and 6th columns, the pixels in the 6th, 8th, and 10th rows will be added by taking into consideration the color barycenter in the Bayer arrangement. Although it is conceivable to add pixels in the 6th, 8th, and 10th rows with the pixels in the 6th and 10th rows being replaced by focus detection pixels as in the case of the horizontal pixel addition described above, such vertical pixel addition is not desirable from the viewpoint of detecting vertical phase differences. Therefore, according to the present embodiment, a pixel skipping operation is performed in the vertical direction. That is, to detect vertical phase differences, focus detection pixels are arranged and added together in the horizontal direction.

Out of the pixel outputs produced as a result of the vertical pixel skipping and horizontal pixel addition, those from the focus detection pixels are extracted and used for focus detection of the taking lens and an image of the subject is generated using the pixel outputs from the pixels other than the focus detection pixels. At this time, image signals from the locations of the focus detection pixels are interpolated from the signals of the surrounding image sensing pixels.

The term "addition" used in the above description includes an "arithmetic average," "weighted average," and the like, but techniques for generating a unit pixel signal by factoring in multiple pixel signals are not limited to these methods.

Configurations of the image sensor, pixel, and column circuit according to the second embodiment are approximately the same as those shown in FIGS. 2, 3, and 4, and focus detection pixels replace pixels having x, y coordinates of (2, 8), (4, 8), and (6, 8) and pixels having x, y coordinates of (5, 11), (7, 11), and (9, 11).

In the second embodiment, the timing for scanning all the pixels without using pixel addition and pixel skipping is similar to the timing shown in FIG. 5.

Figure 8:
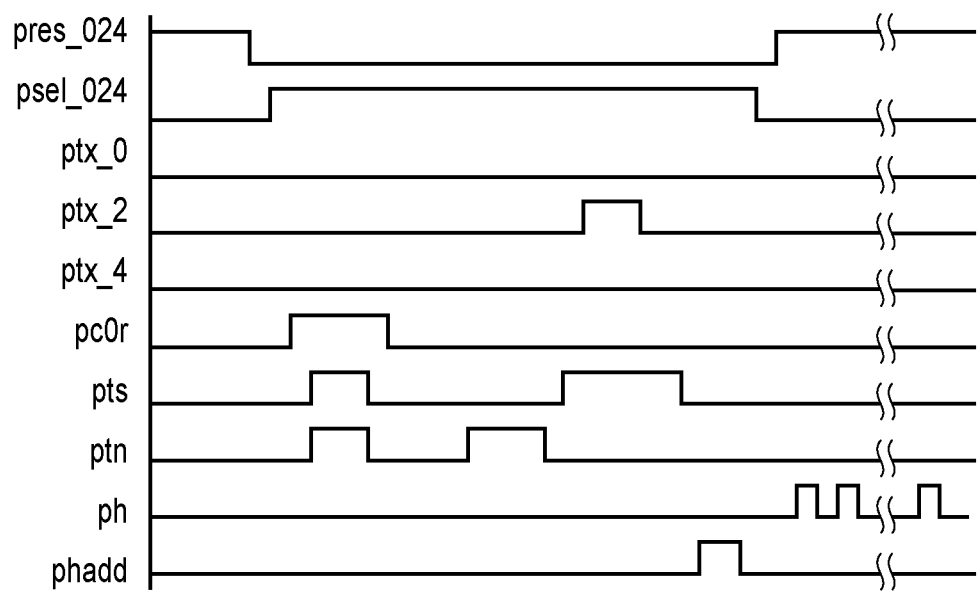
FIG. 8 is a drive timing chart of the image sensor according to the second embodiment.

FIG. 8 is a drive timing chart for realizing vertical ⅓ downsampling and horizontal three-pixel averaging on the image sensor described in the second embodiment.

With the timing chart in FIG. 8, which is approximately the same as the one shown in FIG. 6, instead of driving Ptx_0, Ptx_2, and Ptx_4 simultaneously, only Ptx_2 is driven to read only the pixel signals in the 8th row among the 6th, 8th, and 10th rows in FIGS. 7A to 7C (vertical ⅓ reading). Furthermore, by changing the phadd signal from Low to Hi, then to Low subsequently, signals from the 2nd, 4th, and 6th columns and 8th, 10th, and 12th columns are arithmetically averaged on the holding capacitors 210 and 211 shown in FIG. 4.

Again the need to transfer signals on a row by row basis is eliminated, thereby reducing the actual number of lines to be scanned and resulting in a reduced scanning time. Also, the horizontal scanning circuit 400 can output only the ph(n) signals to the 4th, 10th, 16th, . . . rows and thereby read horizontal three-pixel average signals by reducing the number of pixels in the horizontal direction as well.

It is also possible to realize vertical ⅓ pixel skipping and horizontal ⅓ pixel skipping by keeping the phadd signal at Low.

As described with reference to FIGS. 7A to 8, in the second embodiment, all three of the pixels (pixel group) subjected to horizontal same-color pixel addition are arranged to be focus detection pixels (which have the light-shielding portion on the same side for phase difference detection). This configuration makes it possible to prevent signals of normal pixels and signals of focus detection pixels from being mixed during horizontal three same-color pixel addition without complicating wiring and realize progressive scanning.

Third Embodiment

Figure 9B:
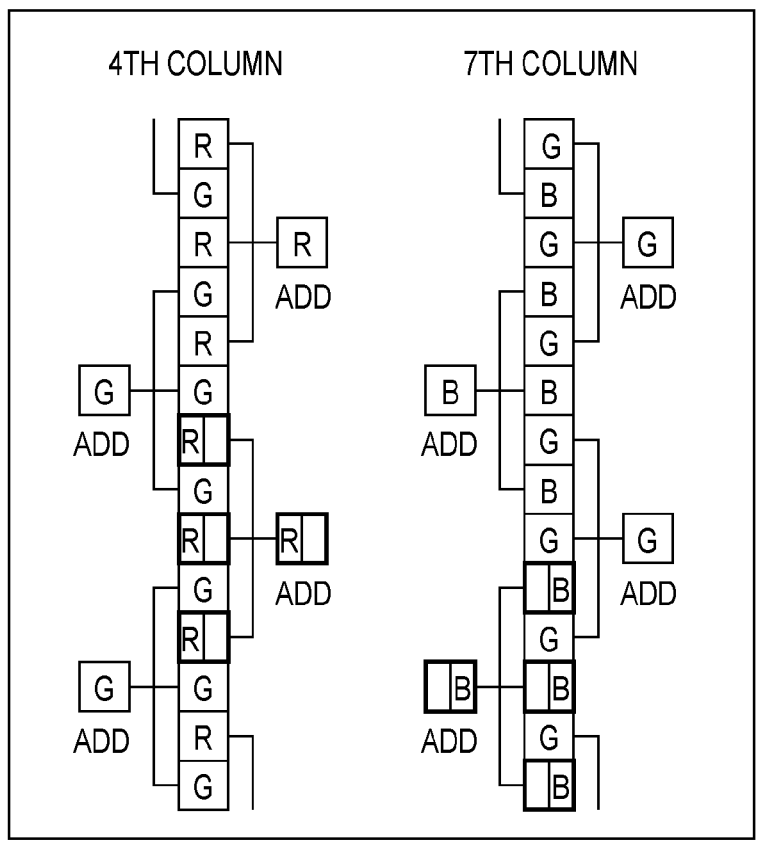
Figure 9C:
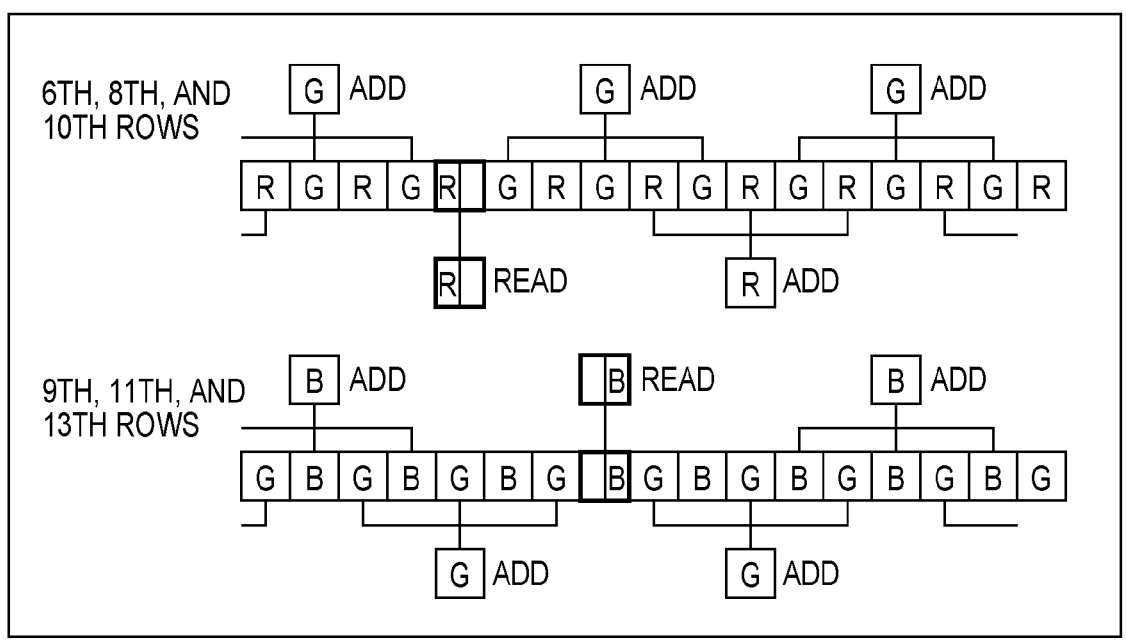

FIGS. 9A to 9C are diagrams showing an exemplary pixel array of part of pixels in an image sensor according to a third embodiment of the present invention, more specifically, an exemplary pixel arrangement in a CMOS solid-state image sensor also in the present embodiment.

The image sensor shown in FIGS. 9A to 9C differs from the image sensor shown in FIGS. 1A to 1C in that the scanning method for the 6th, 8th, and 10th rows and 9th, 11th, and 13th rows shown in FIG. 9C differs from the scanning method shown in FIG. 1C. Otherwise, the image sensor shown in FIGS. 9A to 9C is the same as the image sensor shown in FIGS. 1A to 1C. According to the present embodiment, regarding the columns containing focus detection pixels, horizontal pixel skipping is applied to read only the focus detection pixel among the three pixels of the same color including the focus detection pixel, and pixels on the left and right sides of the focus detection pixel. Regarding the columns containing no focus detection pixel, addition is applied to the three pixels of the same color including the pixel in the column and the pixels on the left and right sides.

For example, regarding the pixels subjected to vertical same-color pixel addition and contained in the 6th, 8th, and 10th rows, since the R pixel in the 4th column is a focus detection pixel, only the pixel in the 4th column is scanned without scanning the pixels of the same color in the 2nd and 6th columns on the left and right sides. Regarding the other pixel columns containing no focus detection pixel, horizontal three-pixel addition is applied by taking into consideration the color barycenter in the Bayer arrangement. The same applies to the pixels subjected to vertical three same-color pixel addition and contained in the 9th, 11th, and 13th rows.

Figure 10:
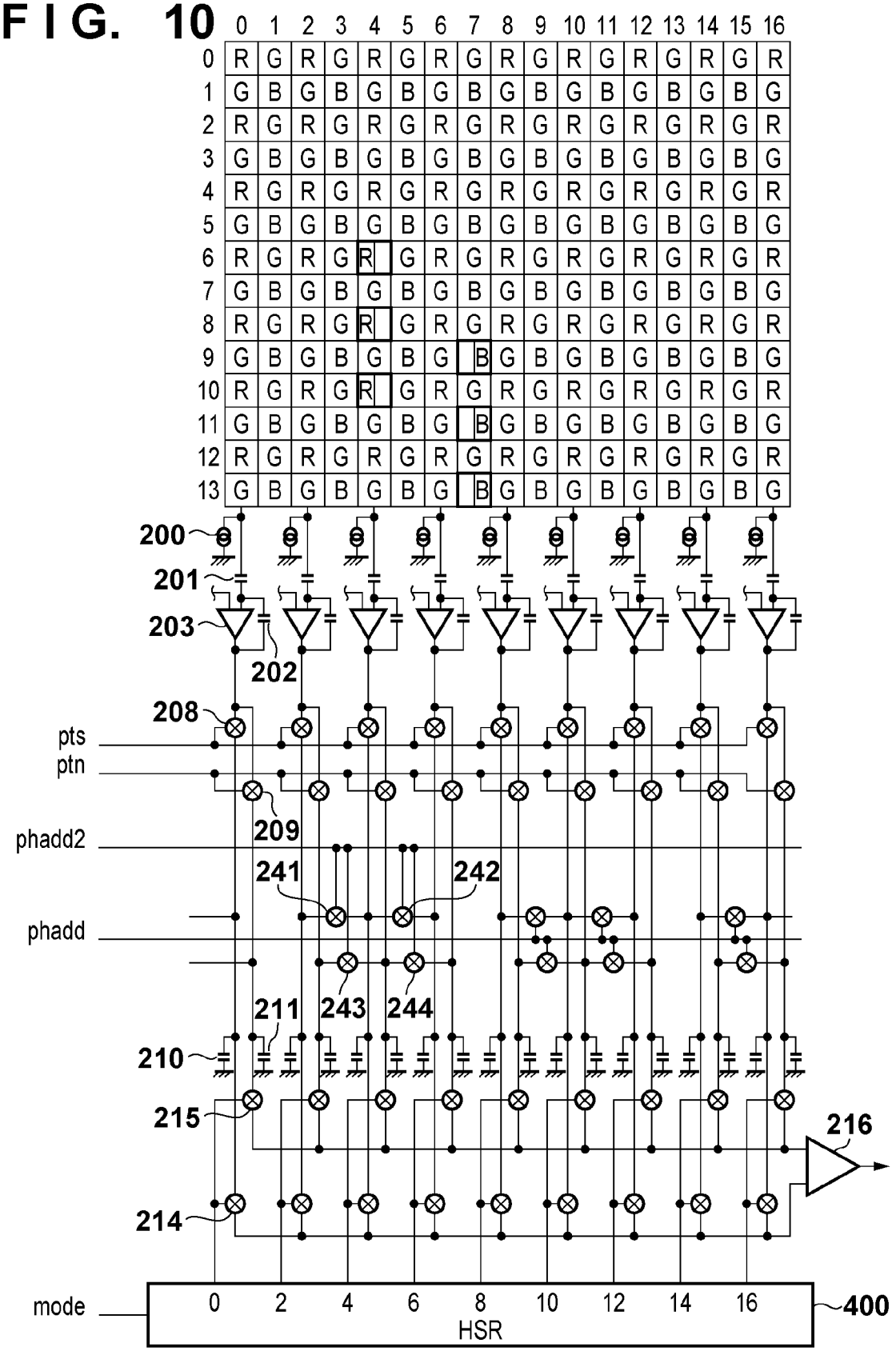
FIG. 10 is a diagram showing a detailed configuration of a column circuit according to the third embodiment.

Configurations of the image sensor and pixel according to the third embodiment are the same as those shown in FIGS. 2 and 3. Configuration of the column circuit 230 according to the third embodiment is different from the configuration in FIG. 4 and is shown in FIG. 10. FIG. 10 differs from FIG. 4 in that a drive signal for horizontal three-pixel addition is divided into phadd and phadd2 and that pixel columns containing focus detection pixels are driven by the phadd2 signal. In this example, phadd2 is used as a drive signal for horizontal three-pixel addition in the 2nd, 4th, and 6th columns.

Figure 11:
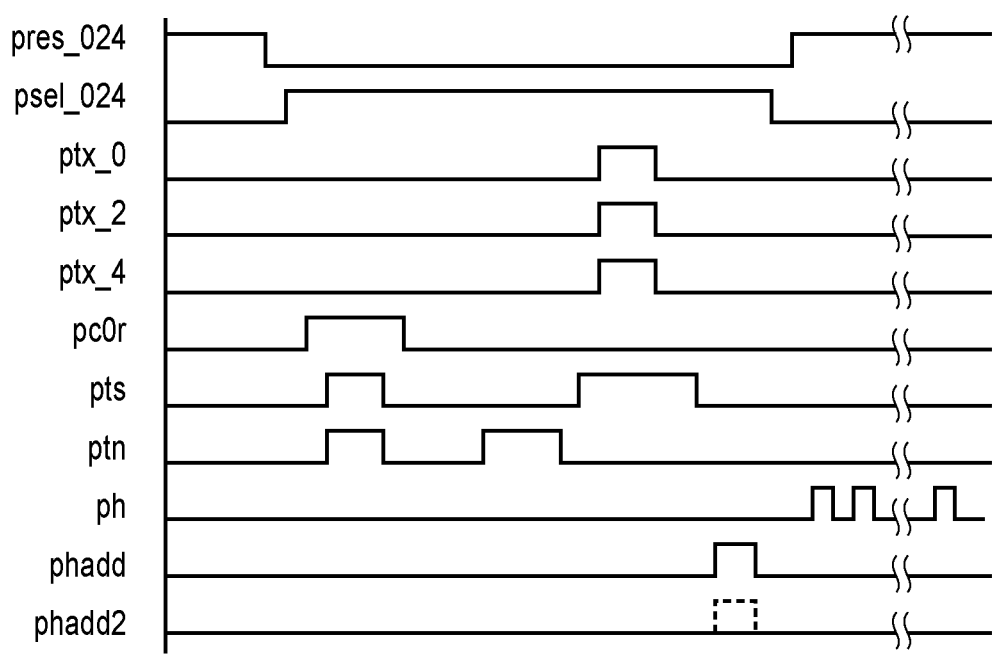
FIG. 11 is a drive timing chart of the image sensor according to the third embodiment.

FIG. 11 is a drive timing chart for realizing vertical three-pixel addition and partial horizontal three-pixel addition on the image sensor according to the third embodiment with such a configuration. In the timing chart in FIG. 11, which is approximately the same as the one shown in FIG. 8, vertical three-pixel addition is carried out by driving Ptx_0, Ptx_2, and Ptx_4 simultaneously. By constantly changing the phadd signal from Low to Hi, then to Low, signals from pixel columns containing no focus detection pixel (the 8th, 10th, and 12th columns in FIG. 10) are subjected to horizontal three-pixel addition on the holding capacitors 210 and 211.

The drive method of phadd2 is changed depending on whether or not the rows to be scanned contain focus detection pixels. For example, in scanning the 6th, 8th, and 10th rows which contain focus detection pixels, horizontal pixel skipping operation is carried out to read signals only from the 4th row with phadd2 kept at Low. On the other hand, in scanning the rows which contain no focus detection pixel, horizontal three-pixel addition is carried out by changing phadd2 from Low to Hi, then to Low together with phadd (indicated by a broken line in FIG. 11).

There are two points worthy of note in the third embodiment. One of the points is that all three of the pixels subjected to vertical same-color pixel addition are focus detection pixels (which have the light-shielding portion on the same side for phase difference detection). The other point is that the focus detection pixel columns are read by pixel skipping in the horizontal direction while the pixel columns containing no focus detection pixel are subjected to horizontal three-pixel addition.

In this way, by minimizing the number of skipped pixels, it is possible to minimize the occurrence of moire even when the subject has a high spatial frequency. Also, it is possible to prevent signals of normal pixels and signals of focus detection pixels from being mixed during vertical pixel addition without complicating wiring and realize progressive scanning.

Again in this example, it is also possible to realize vertical ⅓ reading and horizontal ⅓ reading by driving only Ptx_2 using the same timing as when driving Ptx_0, Ptx_2, and Ptx_4 simultaneously and keeping the phadd and phadd2 signals at Low.

MOS solid-state image sensors are used in the first to third embodiments described above. However, any of image sensors including, for example, a CCD image sensor, a CdS—Se contact image sensor, an a-Si (amorphous silicon) contact image sensor, and a bipolar contact image sensor may be used alternatively.

Also, it has been stated that the image sensor is covered by color filters arranged in a Bayer array, the type and array of color filters are not limited to this and may be changed as appropriate. For example, complementary color filters or an array other than a Bayer array may be used alternatively.

Also, in the first to third embodiments described above, three focus detection pixels are continuous with an R pixel or B pixel in the column direction or row direction. However, the present invention is not limited to three focus detection pixels, and two or more than three focus detection pixels may be arranged continuously, and read by pixel addition and/or pixel skipping. For example, if two focus detection pixels are arranged continuously, the number of pixels to be scanned is reduced, both in the vertical and horizontal directions, to ½ the number of pixels scanned by progressive scanning and if four focus detection pixels are arranged continuously, the number of pixels to be scanned is reduced to ¼. That is, the number of consecutive focus detection pixels can be determined based on the relationship between the number of entire pixels and the number of pixels used for EVF display/the number of pixels required for movie shooting or a desired pixel size.

Fourth Embodiment

Next, description will be given of operation of an image capturing apparatus such as a digital camera resulting from application of the image sensor with the configuration described in the first to third embodiments.

Figure 12:
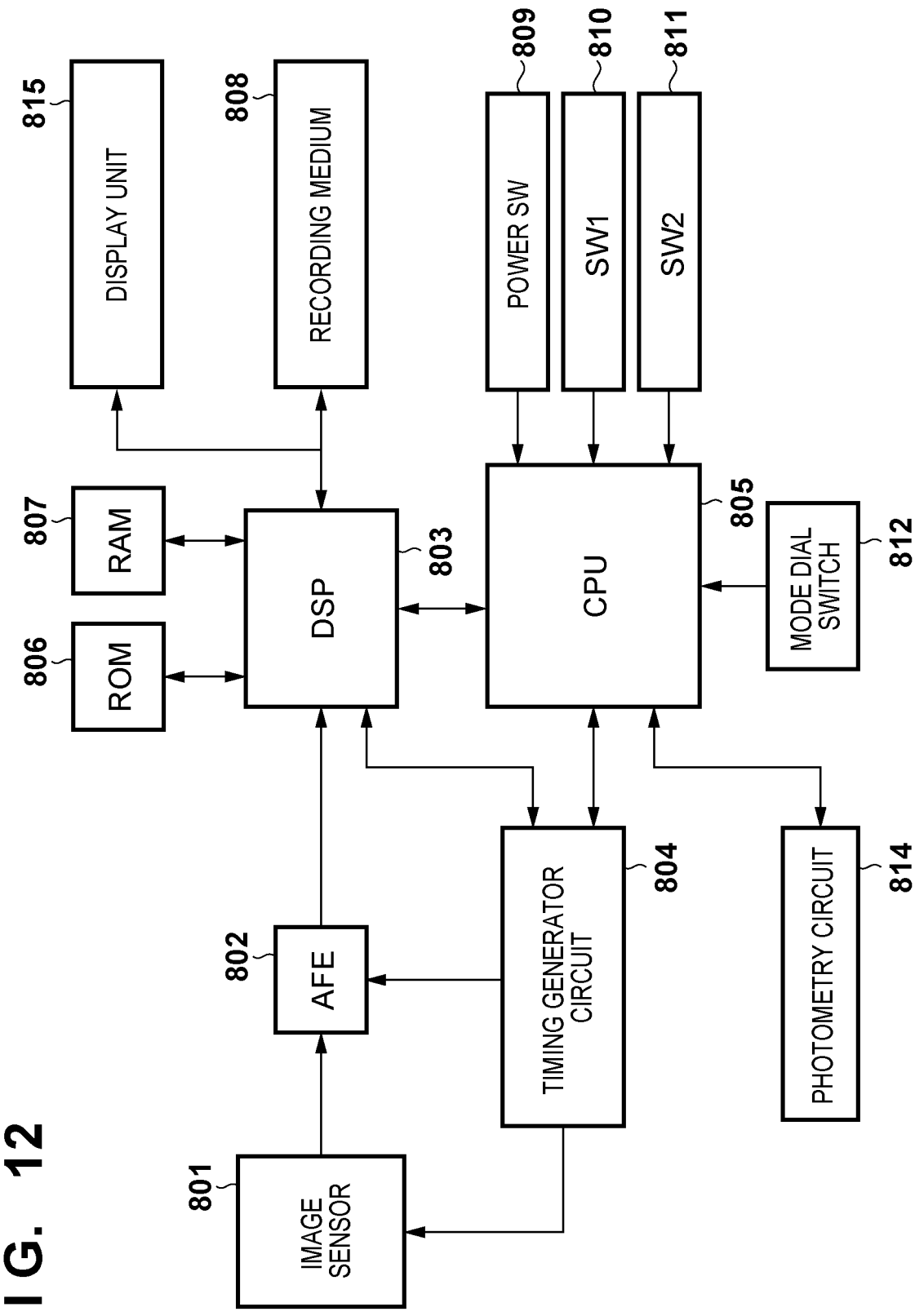
FIG. 12 is a block diagram showing a schematic configuration of an image capturing apparatus according to a fourth embodiment.

FIG. 12 is a block diagram showing a configuration of an image capturing apparatus such as a digital camera. In FIG. 12, an image sensor 801 has any one of the configurations described above in the first to third embodiments.

A signal processing circuit (AFE) 802 receives timing information and the like from a timing generator circuit (TG) 804 and performs amplification and A/D conversion of signals received from the image sensor 801 based on the timing information. A Digital Signal Processor (DSP) 803 performs various correction processes on data from the signal processing circuit 802. Also, the DSP 803 controls various memories such as a ROM 806 and a RAM 807 and writes video data into a recording medium 808.

The TG 804 supplies clock signals and control signals to the image sensor 801, signal processing circuit 802, and DSP 803 and is controlled by a CPU 805.

The CPU 805 controls the DSP 803 and TG 804 as well as various camera functions performed using various parts including a photometry unit and focus control unit (not shown). The CPU 805 is connected with various switches 809 to 811 and performs processes according to states of the switches 809 to 811.

The ROM 806 stores a camera control program, correction table, and the like. The RAM 807 temporarily stores video data and correction data processed by the DSP 803. The RAM 807 allows faster access than the ROM 806.

Reference numeral 808 denotes a recording medium such as a CompactFlash (registered trademark) card (hereinafter referred to as a CF card) adapted to save captured video images and connected to the digital camera via a connector (not shown).

Reference numeral 809 denotes a power switch used to activate the camera, and 810 denotes a shutter switch SW1 used to give a command to start preparatory operations for shooting, such as a photometry process and focus control process. Reference numeral 811 denotes a shutter switch SW2 used to give a command to start a series of image capturing operations for writing signals read out of the image sensor 801 into the recording medium 808 via the signal processing circuit 802 and DSP 803 by driving a mirror (not shown) and shutter. Reference numeral 812 denotes a mode dial switch used to specify a shooting mode of the digital camera such as a moire reduction movie mode (pixel addition) and smear reduction mode (pixel skipping). Reference numeral 814 denotes photometry circuit adapted to measure subject luminance, and 815 denotes a display unit adapted to display captured video images externally.

Figure 13:
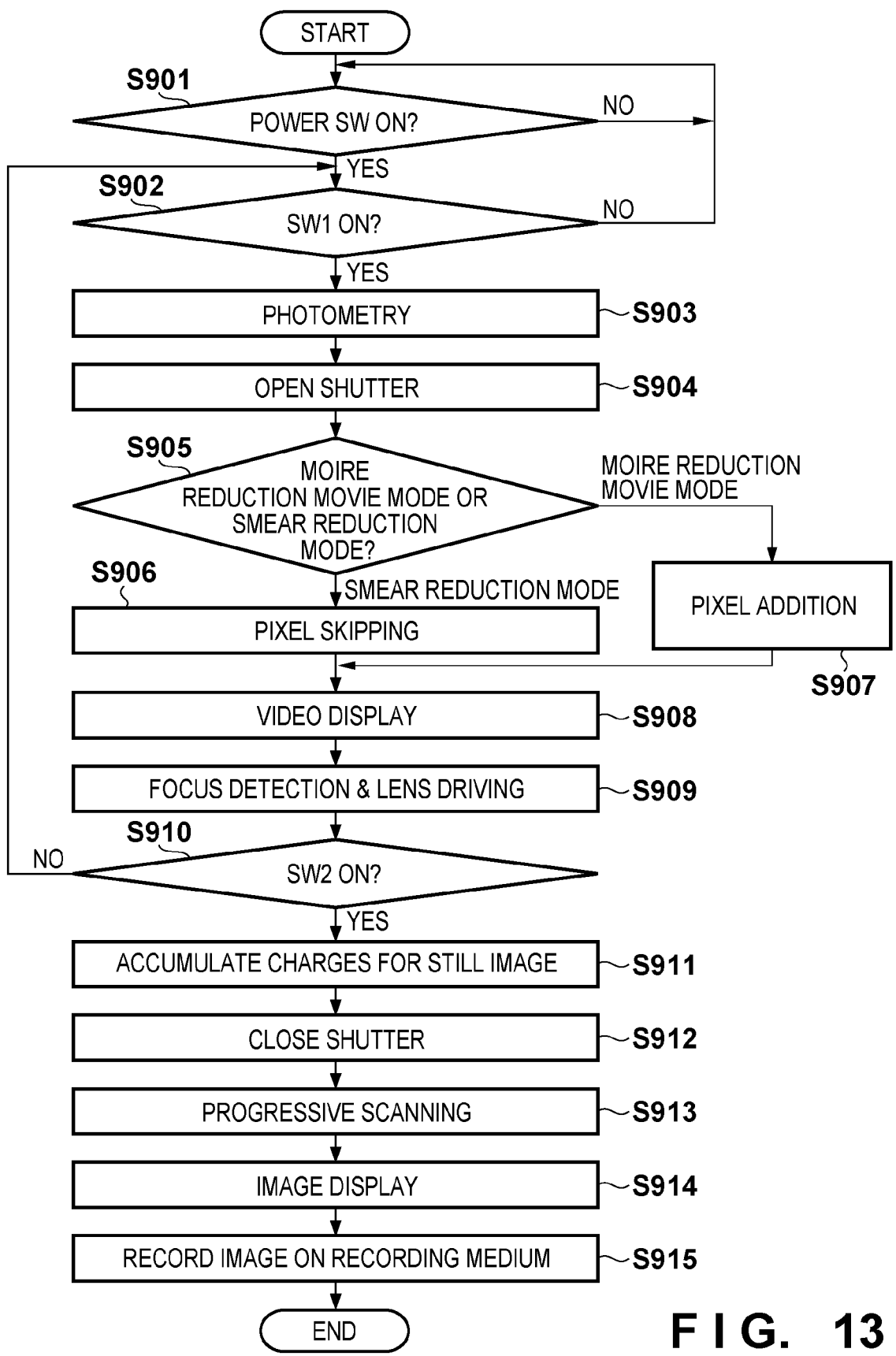
FIG. 13 is a flowchart of a shooting process performed by the image capturing apparatus according to the fourth embodiment.

FIG. 13 is a flowchart of a shooting operation performed by the image capturing apparatus of the configuration shown in FIG. 12, where the configuration includes any one of the image sensors described with reference to FIGS. 1A to 11.

First, in step S901, the image capturing apparatus determines whether the power switch 809 is ON. If the power switch 809 is OFF, the image capturing apparatus repeats step S901. If the power switch 809 is ON, the image capturing apparatus determines in step S902 whether the switch SW1 (810) used to start preparatory operations for shooting is ON. If the switch SW1 (810) is OFF, the image capturing apparatus returns to step S901. If the switch SW1 (810) is ON, the image capturing apparatus moves to step S903.

In step S903, the image capturing apparatus measures the luminance of the subject using the photometry circuit 814. In step S904, the image capturing apparatus opens a mechanical shutter (not shown) to allow light to continue entering the image sensor 801. Subsequently, in step S905, the image capturing apparatus checks the mode dial switch 812 to see what mode the image capturing apparatus is in, the moire reduction movie mode (pixel addition) or smear reduction mode (pixel skipping). If it is found that the image capturing apparatus is in moire reduction movie mode (pixel addition), the image capturing apparatus moves to step S907. In step S907, after accumulating signals, the image capturing apparatus reads the signals using vertical pixel addition and horizontal ⅓ reading, vertical ⅓ reading and horizontal three-pixel addition, or vertical three-pixel addition and partial horizontal three-pixel addition as described above in the first to third embodiments, and then moves to step S908.

On the other hand, if it is found in step S905 that the image capturing apparatus is in smear reduction mode (pixel skipping), the image capturing apparatus moves to step S906, where after accumulating signals, the image capturing apparatus reads the signals using vertical ⅓ reading and horizontal ⅓ reading and then moves to step S908.

In step S908, the image capturing apparatus displays video on the display unit 815 by using the pixel signals read out and by interpolating image signals for the focus detection pixels from signals of surrounding pixels. In step S909, using the focus detection pixel signals before the interpolation, the image capturing apparatus detects a focus state of the subject and adjusts focus by driving the taking lens so as to focus on the subject.

In step S910, the image capturing apparatus determines whether the switch SW2 (811) used to start shooting a still image is ON. If the switch SW2 is OFF, the image capturing apparatus returns to step S902 to proceed to operation for the next frame. That is, in steps S902 to S910, the image capturing apparatus performs so-called EVF operation which involves carrying out shooting and display, focus detection, and lens driving in succession.

If it is found in step S910 that the switch SW2 (811) is ON, the image capturing apparatus goes to step S911 to start accumulating charges in the image sensor for a still image at an optimal lens aperture and focus position based on photometry information obtained in step S903 and focus position information obtained in step S909. When a predetermined amount of exposure is reached, the image capturing apparatus closes the mechanical shutter (not shown) in step S912.

Subsequently, the image capturing apparatus performs progressive scanning in step S913, displays an image on the display unit 815 in step S914 by using the pixel signals read out and by interpolating image signals for the focus detection pixels from signals of surrounding pixels, records a still image signal on the recording medium 808 in step S915, and thereby finishes the shooting operation.

In this way, the image sensor according to any one of the first to third embodiments can be applied to an image capturing apparatus such as a digital camera.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-235877, filed on Oct. 20, 2010 which is hereby incorporated by reference herein in its entirety.

The invention claimed is:

1. An image sensor comprising:
a plurality of pixels covered by color filters and arranged two-dimensionally in a first direction and a second direction perpendicular to the first direction, wherein the plurality of pixels includes a plurality of pixel groups of first focus detection pixels and a plurality of pixel groups of second focus detection pixels;
a read out unit that reads by switching between a first read out method of reading a signal from each of the plurality of pixels and a second read out method of reading signals on a row by row basis in the first direction while adding signals in the first direction within each pixel group including a predetermined number of pixels covered by a color filter of a same color and skipping signals in the second direction; and
a detection unit configured to detect a focus state based on a phase difference in the second direction between two images obtained from signals read out from the first focus detection pixels and the second focus detection pixels,
wherein the first focus detection pixels and the second focus detection pixels are partially shielded from light on different sides in the second direction so as to receive light transmitted through different exit pupil regions.

2. The image sensor according to claim 1, wherein, when reading by the second read out method, the read out unit reads by skipping a predetermined number of signals in the second direction.

3. The image sensor according to claim 1, wherein, when reading by the second read out method, the read out unit reads by skipping a predetermined number of pixels so as to read signals of the first and second focus detection pixels in the second direction and by adding together the signals in the first direction.

4. The image sensor according to claim 1, wherein the read out unit reads signals to a common vertical output line on a row by row basis and transfers the signals read to the vertical output line in sequence in a horizontal direction.

5. The image sensor according to claim 4, wherein the first direction is a vertical direction and the read out unit adds the signals before the signals are read to the common vertical output line.

6. The image sensor according to claim 4, wherein the first direction is the horizontal direction and the read out unit adds the signals after the pixel signals are read to the common vertical output line.

7. The image sensor according to claim 1, wherein the image sensor is incorporated in an image capturing apparatus that includes:
a detector that detects a focus state based on a phase difference between two images obtained from signals read out of the first focus detection pixels and the second focus detection pixels, respectively; and a focus adjuster that adjusts focus based on the detected focus state.

8. The image sensor according to claim 1, wherein the plurality of pixel groups of first focus detection pixels and the plurality of pixel groups of second focus detection pixels are arranged discretely.

* * * * *